United States Patent [19]
Van Phuoc et al.

[11] Patent Number: 5,926,419
[45] Date of Patent: Jul. 20, 1999

[54] SILICON LAYER ARRANGEMENT FOR LAST MASK PROGRAMMABILITY

[75] Inventors: Duong Van Phuoc, Eching, Germany; Daniel D. Friel, Woburn, Mass.; Matthew P. Hull, Jamestown, R.I.

[73] Assignee: Powersmart, Inc., Shelton, Conn.

[21] Appl. No.: 08/892,957

[22] Filed: Jul. 15, 1997

Related U.S. Application Data

[63] Continuation-in-part of application No. 08/473,339, Jun. 7, 1995, Pat. No. 5,710,501.

[51] Int. Cl.$^6$ .................................................. G11C 13/00
[52] U.S. Cl. .......................... 365/189.01; 365/51; 365/63
[58] Field of Search ........................ 365/51, 63, 189.01, 365/226; 437/40

[56] References Cited

U.S. PATENT DOCUMENTS 5,091,762  2/1992  Watanabe ........................ 365/189.01

*Primary Examiner*—Terrell W. Fears
*Attorney, Agent, or Firm*—Scully, Scott Murphy & Presser

[57] ABSTRACT

A method for fabricating an application specific integrated circuit (ASIC) from a multitude of silicon layers, including upper silicon layers and lower silicon layers. A processor for performing defined calculations and a random access memory (RAM) for storing a plurality of variable data values are formed in the lower layers of the application specific integrated circuit. A read only memory (ROM) is formed in the uppermost layer of the application specific integrated circuit using a metal mask. The plurality of control functions and constant data values stored in the read only memory are required for operation of a particular type of battery with a particular type of battery chemistry, such as a rechargeable nickel metal hydride battery, or a rechargeable lithium ion battery. The invention allows one core ASIC to be programmed into several separate final products, each with a different last mask ROM code layer. The method allows a wafer lot to be processed up to the last mask, and then one of several finishing options can be selected.

18 Claims, 5 Drawing Sheets

SILICON LAYER ARRANGEMENT FOR LAST MASK PROGRAMMABILITY

This application is a continuation-in-part application of U.S. Ser. No. 08/473,339, filed Jun. 7, 1995.

BACKGROUND OF THE INVENTION

1. Field of the Invention

The present invention relates generally to a silicon layer arrangement providing for last mask programmability, and more specifically to a silicon layer arrangement providing for last mask programmability as applied particularly to a smart battery for use in an intelligent device having power management capabilities. The smart battery controls the operation of rechargeable Nickel Metal Hydride (NiMH) or Lithium Ion (LiION) or Nickel Cadmium (NiCad) batteries, and the like, to enable the reporting of accurate information to the intelligent device for power management and charge control specific to the battery's state of charge and chemistry.

2. Description of the Prior Art

In any Application Specific Integrated Circuit (ASIC) without a programmable technology, the layers of silicon are arranged according to the fabrication process requirements. When a change is required, due to an error or simply upgraded characteristics, a whole new wafer start is typically required. If many changes occur or are expected, this can be costly in both time and dollars.

Similarly, if an ASIC is essentially the same but for some minor alterations (such as operation with a battery having either 9-cells or 10-cells) then it really becomes two different parts, each requiring full processing from the first silicon layer, to the last silicon layer, even though the differences may only occur on one layer and be very slight. This would cause one part to become two parts, thus decreasing volume costing by a factor of two and significantly increasing the individual part cost.

The present invention as described herein relates to ASICs in general, and in particular as applied to intelligent portable electronic devices such as notebook computers, video cameras, cellular phones, etc., which has enabled the development of smart rechargeable batteries that can communicate with the intelligent device to provide accurate information on the battery's present state of charge, and how best to recharge the battery to maintain maximum battery life, thus enabling the highest number of charge-discharge cycles. A user of such intelligent portable devices utilizing such smart batteries will not only know how much charge is left in the battery, but battery run time at various rates of power consumption. This enables the user to select a mode of operation that will enable maximum service life on the remaining state of charge and, how long the device will continue to operate.

Prior art rechargeable battery units have been provided with means for generating some desired information to their users, including for instance, a charge monitor and fuel gauge such as that disclosed in U.S. Pat. No. 5,315,228 which discloses a method for calculating state of charge and reporting run time to empty to the host computer system.

However, there is a need for a rechargeable power unit that will accurately maintain its own state of charge information even when nominally fully discharged such that a user will have instantaneous access thereof. Moreover, there is also a need for an intelligent rechargeable battery that can provide the user with an accurate prediction of its remaining operating time at various levels of power consumption. The user of such an intelligent device, such as a portable computer, can thus elect to power down a hard disk drive to extend the operation of the portable computer for a longer period of time than would had been possible at the higher rate of power consumption.

SUMMARY OF THE INVENTION

To improve the ability to change the contents of a multiple silicon layer ASIC, a new arrangement of the silicon layers is contemplated to allow the layer which would require changes between different versions of the ASIC (or in which changes are foreseen) to be placed on the top of the arrangement. At the top it becomes the last layer to be processed and therefore the last operation in the fabrication steps. Therefore, it may be changed at any point up until the last processing step.

If an ASIC is basically the same as another ASIC except for a few known items, (such as a difference of a rechargeable battery with either 9-cells or 10-cells), it may be processed as one part but at the last stage (last layer or last 'mask') it can be processed to completion as either one or the other (a 9-cell part or a 10-cell part, for example.) This flexibility allows the volume to be maintained as if the ASIC were only a single part. By placing all of the differences between the two or more versions in the final stage of the fabrication process, then the ASIC can be processed as if it were only a single part up until the final stage of the fabrication process.

The present invention allows one core ASIC to be programmed into several separate final products, each with a different last mask ROM code layer. The method allows a wafer lot to be processed up to the last mask, and then one of several finishing options can be selected.

The cost of EEPROM or EPROM (programmable) technology is relatively high when compared to ROM mask options. The present invention provides a programmable (easy to change) ROM mask option while still maintaining low-cost high-volume advantages. The last mask concept uses the same processing of the ASIC but rearranges the fabrication to allow the ROM mask to be fabricated last, thus providing the most flexibility in fabrication of the ASIC.

Specifically, this method was used to fabricate a 9-cell NiMH version of smart batteries and a 10-cell NiMH version of smart batteries. The only differences between these two versions are the default cell count values (9 or 10) and the default calibration constants. All of these differences are provided in the last stage Read-Only-Memory (ROM) code portion of the ASIC. This concept was extended further, and the differences included the complete code for NiMH and LiION in separate versions. The ROM code contains all of the constants required for operation of each particular type of battery chemistry and the control functions for different aspects of the hardware which may only be used in one particular battery chemistry. For example, extra cell-input pins are not used in NiMH so that the ROM code disables their use.

Accordingly, it is an object of the present invention to provide a silicon layer arrangement for last mask programmability for a smart battery device for use with a rechargeable battery to be installed in a host computer that will optimize the performance of the rechargeable battery throughout its life cycle.

It is still a further object of the instant invention to provide a smart battery device that is an application specific integrated circuit (ASIC) having analog and digital components.

Another object of the instant invention is to provide a smart battery device wherein the analog and digital components of the ASIC comprise CMOS semiconductor technology designed for improved accuracy, and high A/D converter resolution with minimal power consumption.

Another object of the instant invention is to provide a smart battery device that includes a ROM memory that is manufactured by a process that facilitates the programming of ROM in an upper or respectively later produced layer.

Yet furthermore, an object of the instant invention is to provide a smart battery device that includes a ROM memory device whereby the programming of ROM is effected in a metal mask.

In accordance with the teachings herein, the present invention provides a method for fabricating an application specific integrated circuit from a multitude of silicon layers, including upper silicon layers and lower silicon layers. A processor for performing defined calculations and a random access memory for storing a plurality of variable data values are formed in the lower layers of the application specific integrated circuit. A read only memory is formed in the upper layers of the application specific integrated circuit, and a plurality of control functions and constant data values are stored in the read only memory.

In greater detail, the read only memory is formed in the uppermost layer of the application specific integrated circuit by using a metal mask to form the read only memory. The plurality of control functions and constant data values stored in the read only memory are required for operation of a particular type of battery with a particular type of battery chemistry, such as a rechargeable nickel metal hydride battery, or a rechargeable lithium ion battery. In greater detail, a plurality of defined algorithms are stored for performing the control functions, such as for a customer having a need for a specific algorithm. The constant data values can include a default cell count value and default calibration constants.

DETAILED DESCRIPTION OF THE PREFERRED EMBODIMENT

A smart battery device is typically intended for use with an intelligent host device such as a portable computer, portable video camera or cellular telephone having a system management bus and a smart charger, or an intelligent host device having a system power manager that can receive and send data over a system management bus.

Figure 1:
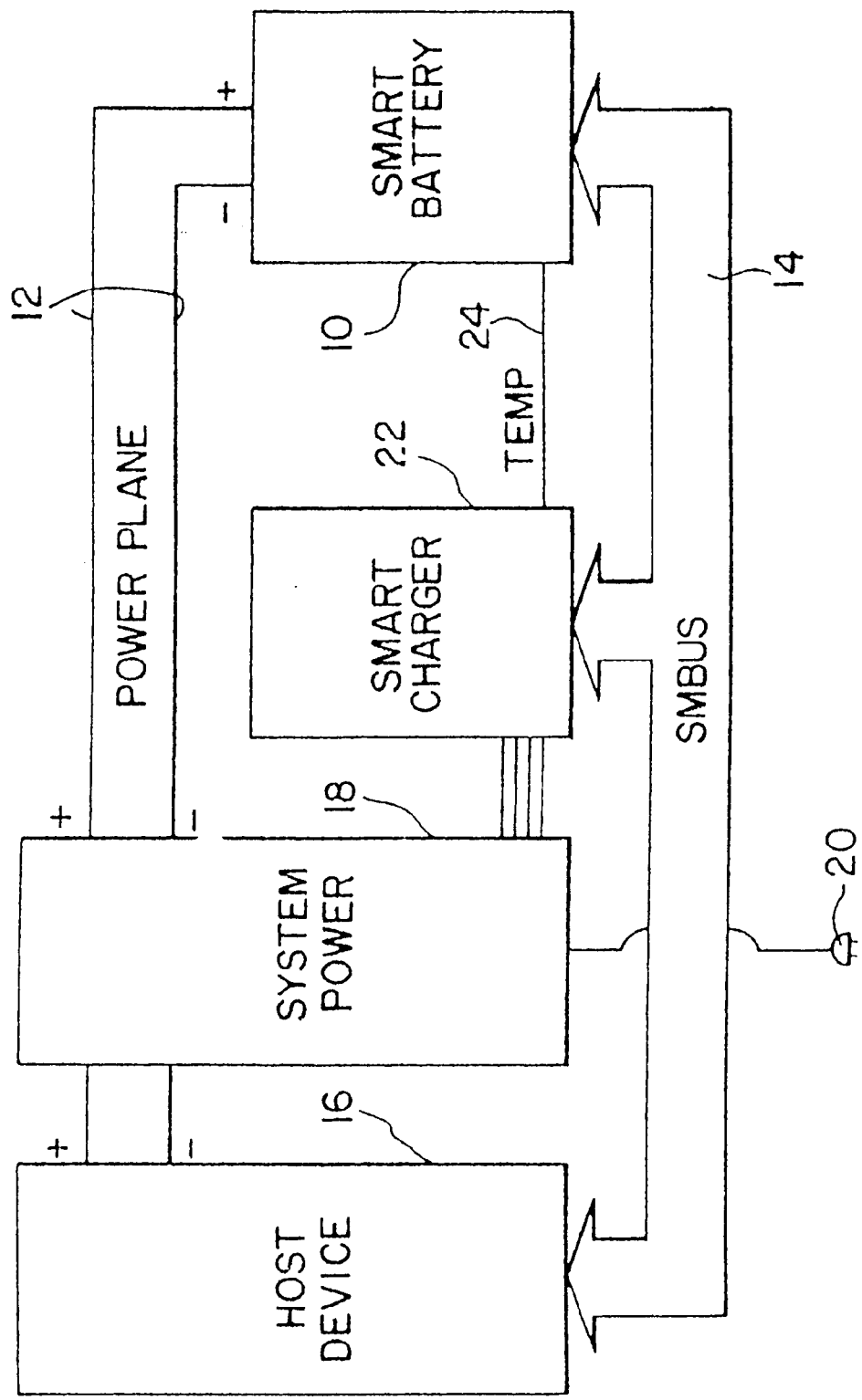
FIG. 1 is a diagrammatic block diagram of a smart battery device connected to a host computer and battery charging device.

A representative example of such a system is illustrated in FIG. 1, wherein the smart battery 10 is connected to a power plane 12 to supply and receive electrical energy over the power plane, and a system management bus 14, which is a bi-directional modified I2C data bus (communication interface) that communicates with a host device 16 which may be a portable computer. The host device 16 may be powered by the smart battery 10, or by the system power supply 18 and a conventional AC source 20. A system power supply or power management system also communicates with a smart charger 22 which may be used to determine the rate and duration of charge sent to the smart battery by the power supply. Smart charger 22 also communicates with the system management bus 14, and may receive a temperature signal representative of battery cell temperature on a separate line feed 24. A detailed functional description of the system management bus 14 (bi-directional modified I2C data bus) can be found in the Intel\Duracell System Management Bus Specification, Rev 1.0, (February 1995).

The system power management system 18 may supply or draw power to/from the smart battery 10 over power plane 12, depending upon the state of charge in smart battery 10, and depending upon the presence or absence of power at AC source 20.

The smart charger 22 may periodically poll the smart battery 10 for charge characteristics, and adjust output to match a smart battery charge request. Optionally, and if selected by the user of the host device, the smart charger 22 can override the smart battery's charge rate request and charge the smart battery at a higher or quick charge rate. The user of the host device does not necessarily need to override the smart battery's request. The smart battery may periodically broadcast the desired charging current, or the smart charger 22 polls the smart battery for a charging current. The host or the charger need not comply with the smart battery's request and can provide a greater or lesser amount of power than requested.

The host device 16 may communicate with the smart battery over the system management bus 14 and request information from the battery for use in the system power management scheme, thereby providing the user of the host device with information about the battery's present state and capabilities. The host device 16 will also receive notice of critical events, including alarm conditions, remaining capacity below a user set threshold value, a remaining run time below a user set threshold value, or an end of discharge signal. The alarm conditions include but are not limited to overcharging, overtemperature, a remaining charge capacity below a predetermined or user set capacity, or, a run time below a predetermined or user set run time remaining.

The smart battery can report out an instantaneous current value being drawn from the battery, current values averaged over predetermined time intervals, present temperature and present voltage.

The smart battery may also report out a number of battery status indicators, indicating whether or not the battery is charging or discharging, that charging is complete, or, that the battery is fully discharged.

In addition, it can provide calculated values including run time remaining at a present current usage, a run time remaining at an average current use, a run time remaining at optimal current use, and a predicted run time remaining at a host device selected current level (discharge rate).

The smart battery device 10 is also provided with a read-only memory (ROM) that is manufactured to contain a set of predefined battery identification parameters which may include manufacturer data, cell chemistry, design capacity, design voltage, and a unique device identification number. The predefined battery identification parameters are available, for either the host device or the smart charger, to assist them in the selection of optimal usage and charge parameters for the smart battery.

The smart battery is also capable of recommending a desired charge current, reporting a time remaining to full charge, a battery capacity available at full charge, and the number of times the battery has been charged or discharged.

The smart battery of the present invention utilizes a hybrid integrated chip (IC) containing an embedded microprocessor and a novel analog to digital connector which receives analog signals from the battery and converts them to digital signals representative of battery voltage, current and temperature. The smart battery microprocessor then calculates actual charge parameters over time from these digital signals according to a predetermined algorithm in which $CAP_{rem}$ is the remaining capacity of the battery which is continuously assigned a new value to reflect adjustments for effective charge, discharge, and self discharge.

Figure 2:
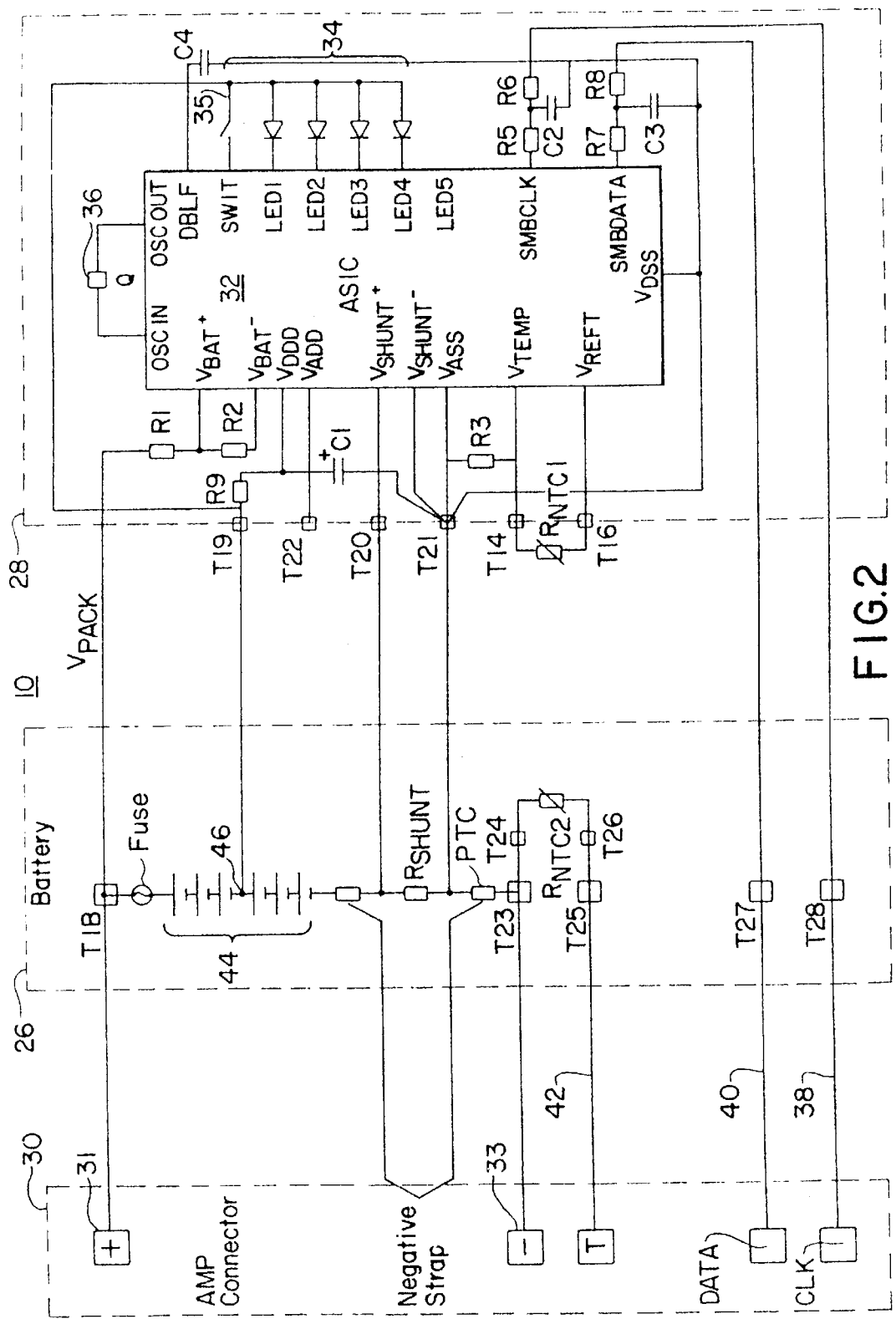
FIG. 2 is a simplified block diagram of the smart battery device and connector, including a pinout diagram of an Application Specific Integrated Circuit (hybrid IC) used in the present invention.

Smart battery 10 of the present invention is more fully illustrated in FIG. 2 which is a simplified block diagram of the smart battery, an advanced design multi-pin connector, and a battery module 28 which includes a pinout diagram of the hybrid ASIC 32 used in the present invention. As illustrated in FIG. 2, the smart battery device 10 includes a plurality of rechargeable cells generally indicated at 26 which may be Nickel Metal Hydride (NiMH) or Nickel Cadmium (NiCad) cells.

For the purposes of an illustrative but not limiting example, in the following specification, 6 NiMH cells having a nominal 2400 maH capacity, will be assumed. Such an arrangement of cells is particularly appropriate for powering a portable computer.

A suitable advanced design multi-pin battery connector 30 is used to connect the smart battery to a host device 16 or power supply 18, as previously described with respect to FIG. 1. The multi-pin connector 30 includes a positive power supply terminal 31 which is connected to the positive terminal of the first cell, and a negative power supply terminal 33 which is connected to the negative terminal of the last cell. A plurality of rechargeable cells may be connected in series therebetween as illustrated in FIG. 2.

The smart battery module 28 includes a hybrid IC 32 containing a microprocessor 50 (FIG. 3) and a plurality of sensor means for generating analog signals representative of battery voltage, current and temperature. The module also includes a series of four (4) LEDS 34 driven by an LED drive circuit 53 and a manually actuable switch 35 which may be manually actuated by an end user to determine the state of charge in the battery even when the battery has been removed from the host device 16. The LEDS 34 may be used to represent a relative state of charge (SOC) in a logic scheme as follows. If the state of charge is greater than 75% (or less than 100%) then all 4 LEDS are illuminated. If the SOC is from 50% to 75%, then 3 LEDS are illuminated; if SOC is from 25% to 50%, then 2 LEDS are illuminated; if SOC is from 10% to 25%, then 1 LED is illuminated, and if SOC is less than 10%, a single LED is flashing. As mentioned above, relative SOC is remaining capacity relative to last full capacity.

Figure 3:
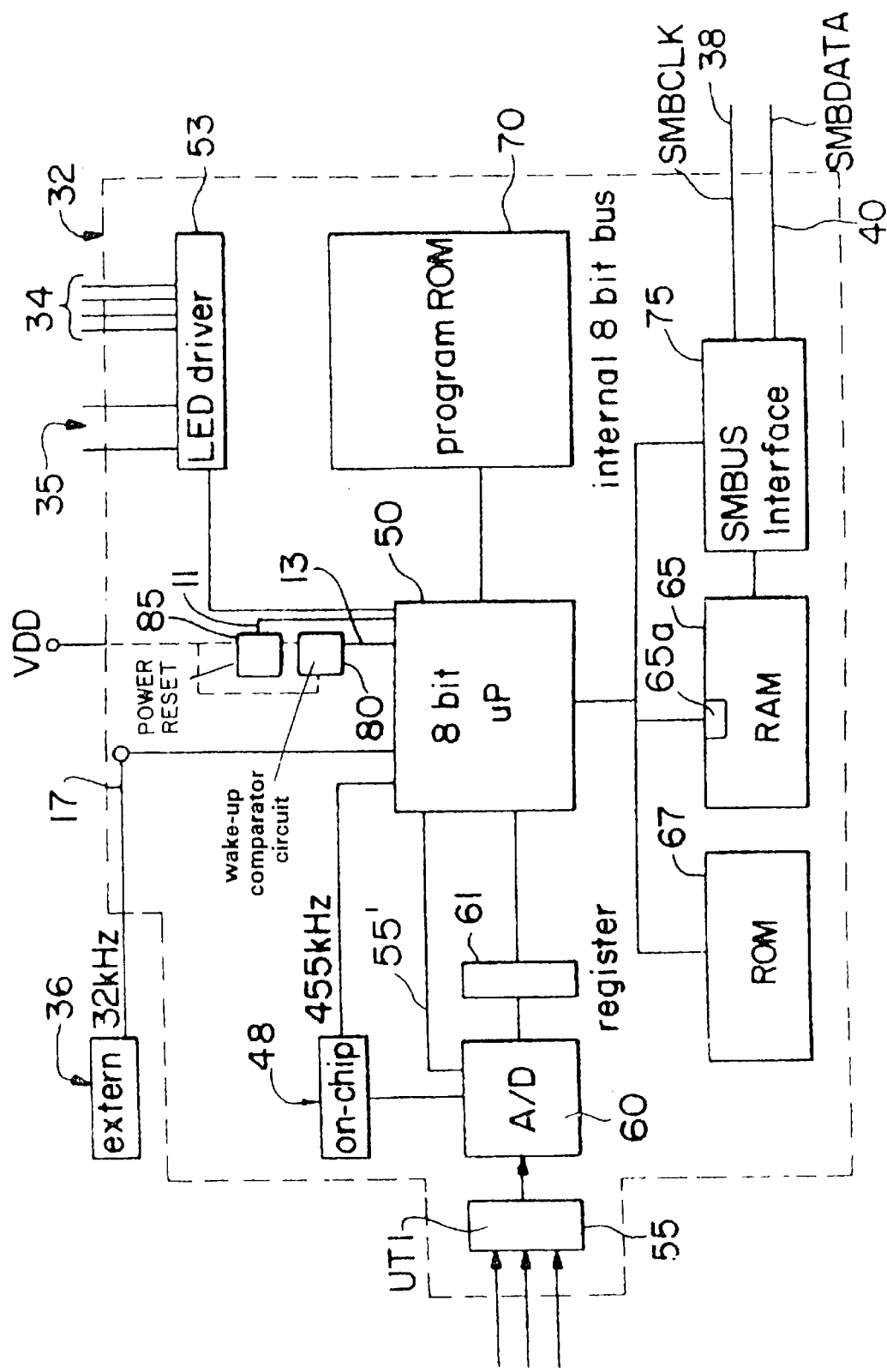
FIG. 3 illustrates a simplified block diagram of the hybrid IC 32 that includes the microcontroller of the smart battery device of the instant invention.

As shown in FIGS. 2 and 3, the hybrid ASIC 32 also includes an external crystal 36 operating at a fixed frequency which is used as a time base for integration of battery current over time, and to ensure stable start up after a prolong standby period when power is reapplied to the smart battery 10. The smart battery of the present invention utilizes two separate oscillators, a low power RC oscillator 48 formed within the hybrid IC 32 and used as an operating clock for the hybrid IC and the A/D converter 60 therein, and, the external crystal 36. The external crystal 36 is used to restart the measurement period after each predetermined interval to provide for accurate measurements and integration of battery conditions, regardless of battery temperature, which can adversely affect the accuracy of the internal oscillator. The frequency value of external crystal 36 may range from 32 KHz to 33 kHz and the frequency value of oscillator 48 may range from 410 kHz to 500 kHz.

In one embodiment, the hybrid IC 32 can include a MIKRON GmbH low cost, high performance, CMOS 8 bit microcontroller ($\mu$P) 50 with an advanced RISC architecture. A reduced set of 32 instructions that are all single cycle instructions (except for program branches which are two cycles), and a Harvard architecture scheme achieves a high level of performance with minimal power drain. The microprocessor operates at a clock input anywhere from DC to 10 MHz with 12 bit wide instructions and 8 bit wide data path. A free programmable Counter/Timer circuitry is provided as well as a free programmable Watchdogtimer. Additionally, the microprocessor is addressable in direct, indirect, and relative addressing modes. The microprocessor is commercially available from Mikron Gmbh, located at Am Soeldner 17 D-85399, Hallbergmoos, Germany, and is available in the U.S.A. through MICROCHIP Technology, Inc., Chandler, U.S.A.

The hybrid IC 32 also includes a plurality of analog circuits which are used, in combination with external analog sensors, to generate digital signals representative of battery voltage, current and temperature as will be hereinafter explained.

For example, battery voltage is obtained from a voltage divider circuit which includes R1 and R2 which are internally switched by a NMOS transistor within the hybrid IC 32 to provide voltage measurement during a small portion of each measurement interval, thereby minimizing current drain on the battery cells 26.

Further details on operation of the circuits used herein are disclosed in parent application Ser. No. 08/473,339, filed Jun. 7, 1995, the entire disclosure of which is expressly incorporated by reference herein.

As shown in FIG. 3, the hybrid IC 32 further includes RAM memory 65 which can store up to 128 8-bit registers for communication of calculated battery parameters, and a ROM memory 67 for storing look-up table values utilized in the battery capacity calculation algorithm. The exact amount of RAM, ROM, and program ROM memory is a design choice, and these values change as the ratio between calculated and preset parameters vary.

The hybrid IC 32 further includes up to 4 kbytes of additional ROM memory 70 for addressing and storing the various algorithms, subroutines, manufacturer data, and data constants utilized by the smart battery module for calculating the battery capacity, sending messages such as alarms and battery charger control commands etc., and handling message requests from external devices.

The programmable ROM generator is implemented by means of a metal mask as opposed to conventional ROM generation by means of diffusion masking. In accordance with the information which was to be permanently stored, transistors were generated in a matrix arrangement through diffusion, whereby the information was coded in the plane through the distribution of the transistors in the diffusion step. Thus, the ROM generator generates in effect, a ROM matrix, whereby the presence or respective absence of an MOS transistor stands for a logic "0" respectively "1." A disadvantage of a ROM matrix with the programmable level of diffusion is that the diffusion process, which is incorporated as one of the first steps of a CMOS process, can not be changed when there is a change in ROM contents, thus, rendering impossible the production of wafer stock for a particular type of ROM.

By contrast, the advantage of a ROM matrix programmable in a metal layer is that wafer stock with the same basic layers up to the metal may be fabricated. Thus, a microprocessor family with different ROM contents can be realized with low cost and fast turn around time. Additionally, the pre-manufacture of a portion of the ROM with the flexibility of programming in application specific information in the upper or respectively later produced layers, is possible.

The hybrid IC chip itself may comprise thirteen or fourteen layers, with the $9^{th}$ or $10^{th}$ layer (i.e. one of the upper layers) being a layer of metal, wherein the distribution of the metal is characteristic for the storing contents of the ROM. Thus, in the hybrid IC ROM manufacturing process, nine (9) layers are grown and the next four ROM programming layers are grown dependent upon the customer's particular needs (i.e., special properties of the battery pack).

Figure 4:
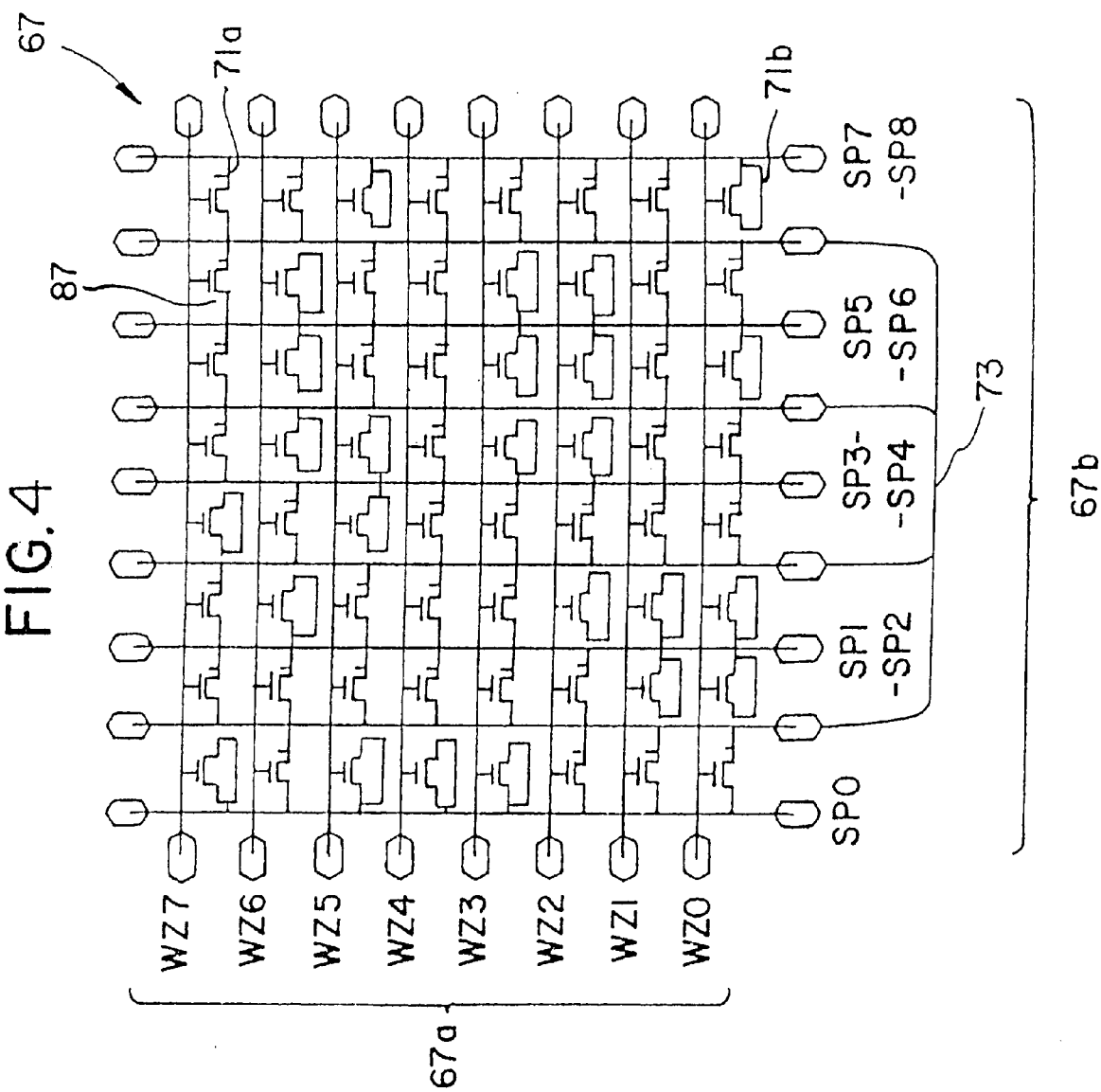
FIG. 4 illustrates a schematic sketch of the programming of a ROM included in the smart battery device.

FIG. 4 shows a ROM matrix with the metal layer as a programmable layer. A MOS transistor 71 for the matrix is always present on the matrix and will either serve as a logical "0" or "1". Specifically, FIG. 4 schematically illustrates the ROM 67 of the smart battery device that is programmed according to the unique process as follows: The represented ROM matrix consists of eight word lines 67a and indicated as WZ0, . . . , WZ7 and 9 spaces 67b and indicated as SP0, . . . , SP8, whereby the spaces SP1,SP3, SP5,SP7 connect with a virtual ground line 73. At each location of the matrix, there is produced a transistor in the diffusion step, three transistors 71a, 71b, and 87 of the matrix are shown in FIG. 4. For the programming of a logic "0," in a respective word line, the drain or respective source electrodes of a transistor are connected to a metal mask with the corresponding source or respectively drain electrodes of the joining transistors or the joining transistor. The drain or respective source electrodes of such a transistor are connected with the gap lines or, respectively, the virtual ground lines 73. Transistor 71a in word WZ7, as shown in FIG. 4, is programmed for a logic "0" as its drain is connected with the source of connecting resistor 87 which is tied to virtual ground line SP6.

Logic "1" in contrast therewith is probed in, in that the drain or respectively source electrodes are connected to a common line, preferably, as can be ascertained from FIG. 4, to a gap line SP0,SP2,SP4,SP6,SP8. Thereby, the transistors, such as the transistor 71b of word WZ0 as shown in FIG. 4, are short circuited.

The connections of the transistors are thus initially determined with the application of the metal mask. In the usual manner two (through contacting) metal masks are applied on the ROM. In should be understood that in this instance preferably the lower of the two metal masks, meaning the mask which is located closer to the transistors, is employed for the short circuiting and the connection of the applicable transistors. Inasmuch as the transistors are short circuited, this does not influence the operation of the metal mask which is employed for the contacting. Since this metal mask is usually one of the uppermost layers, for example the tenth of about 14 layers, the inventive ROM can be pre-manufactured up to the ninth layer and then programmed and manufactured in accordance with the application.

Figure 5:
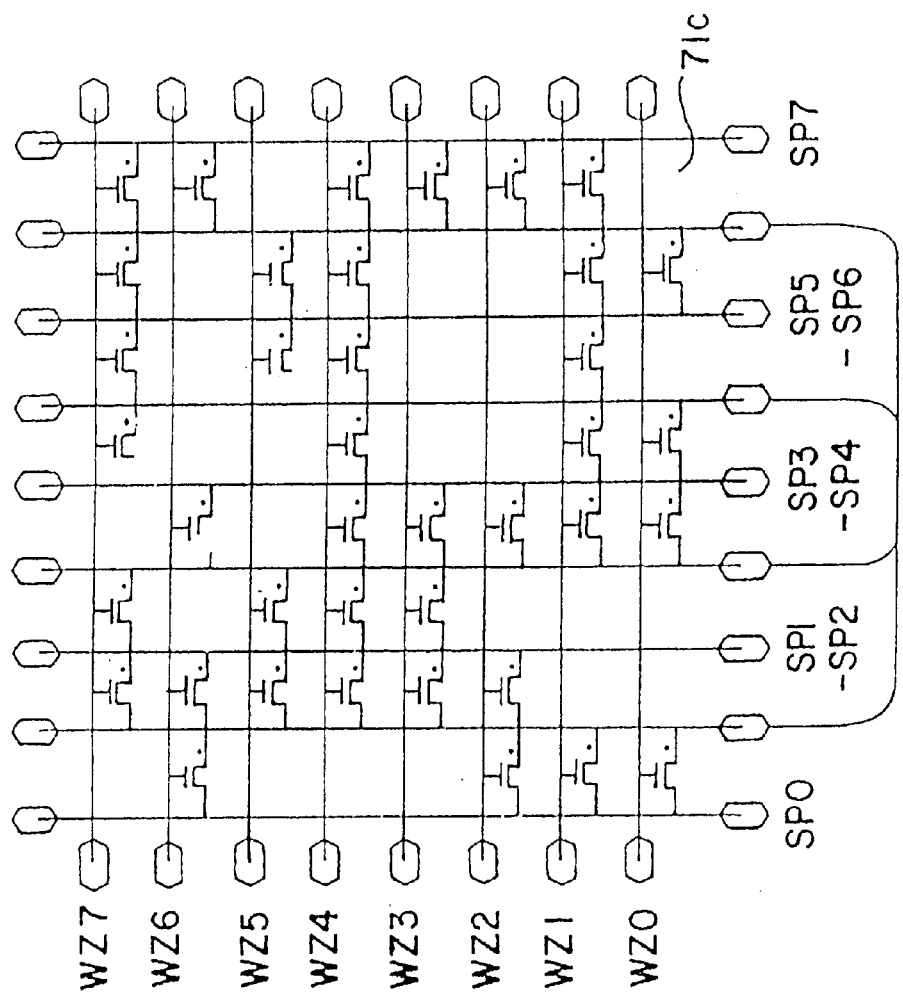
FIG. 5 is a schematic sketch of the transistor arrangement of a ROM programmed pursuant to the prior art.

In FIG. 5 there is illustrated a usual programmed ROM. It can be ascertained from FIG. 5 that the transistors, which are short circuited in FIG. 4, are in any event not produced in the diffusion mask. As shown in FIG. 5, the transistor 71c which is not present corresponds to a short circuited transistor 71b in the metal mask pursuant to the process described above.

Each of the algorithms, subroutines, manufacturer data, and data constants stored in ROM are utilized by the smart battery module for calculating the battery capacity, etc. Further details of the smart battery algorithm for reporting battery parameters to an external device is found in applicant's issued U.S. Pat. No. 5,633,573, assigned to the assignee of the instant invention and the disclosure of which is expressly incorporated by reference herein.

While several embodiments and variations of the present invention for a silicon layer arrangement for last mask programmability are described in detail herein, it should be apparent that the disclosure and teachings of the present invention will suggest many alternative to those skilled in the art.

What is claimed is:

1. A method for fabricating an application specific integrated circuit, comprising:
   a. forming the application specific integrated circuit from a multitude of silicon layers, including upper silicon layers and lower silicon layers;
   b. forming a processor for performing defined calculations, and a random access memory for storing a plurality of variable data values, in the lower layers of the application specific integrated circuit; and
   c. forming a read only memory in the upper layers of the application specific integrated circuit; and
   d. storing a plurality of control functions and constant data values in the read only memory in the upper layers of the application specific integrated circuit.

2. A method according to claim 1, wherein the step of forming the read only memory comprises forming the read only memory in the uppermost layer of the application specific integrated circuit.

3. A method according to claim 2, wherein the step of forming the read only memory in the uppermost layer includes using a metal mask to form the read only memory.

4. A method according to claim 3, wherein the step of storing includes storing control functions and constants required for operation of a particular type of battery with a particular type of battery chemistry.

5. A method according to claim 4, wherein the step of storing includes storing defined control functions and constant data values for a rechargeable nickel metal hydride battery.

6. A method according to claim 4, wherein the step of storing includes storing defined control functions and constant data values for a rechargeable lithium ion battery.

7. A method according to claim 4, wherein the step of forming the read only memory includes the step of storing a plurality of defined algorithms for performing the control functions.

8. A method according to claim 4, wherein the battery system is for a customer having a need for a specific algorithm, and the step of forming the read only memory includes the step of storing said specific algorithm in the read only memory.

9. A method according to claim 4, wherein the step of storing includes storing a default cell count value and default calibration constants.

10. A method according to claim 4, wherein the step of storing includes storing constant data values required for operation of a particular type of battery chemistry and control functions for control of hardware which are used in a particular type of battery chemistry.

11. A method according to claim 1, wherein the step of forming the read only memory in the upper layers includes using a metal mask to form the read only memory.

12. A method according to claim 1, wherein the step of storing includes storing control functions and constants required for operation of a particular type of battery with a particular type of battery chemistry.

13. A method according to claim 12, wherein the step of storing includes storing defined control functions and constant data values for a rechargeable nickel metal hybride battery.

14. A method according to claim 12, wherein the step of storing includes storing defined control functions and constant data values for a rechargeable lithium ion battery.

15. A method according to claim 12, wherein the battery system is for a customer having a need for a specific algorithm, and wherein the step of forming a read only memory includes the step of storing said specific algorithm in the read only memory.

16. A method according to claim 12, wherein the step of storing includes storing a default cell count value and default calibration constants.

17. A method according to claim 12, wherein the step of storing includes storing constant data values required for operation of a particular type of battery chemistry and control functions for control of hardware which are used in a particular type of battery chemistry.

18. A method according to claim 1, wherein the step of forming a read only memory includes the step of storing a plurality of defined algorithms for performing the control functions.

* * * * *